US005685511A

United States Patent [19]

Ghany et al.

[11] Patent Number: 5,685,511

[45] Date of Patent: Nov. 11, 1997

[54] BANNER MOUNT

[76] Inventors: Mitchell F. Ghany, 62 Duggan Drive, Suite 1, Brampton, Ontario, Canada, L6Y 4J2; Francisco F. Aguiar, 2 Moffatt Avenue, Brampton, Ontario, Canada, L6Y 2M8

[21] Appl. No.: 568,137

[22] Filed: Dec. 6, 1995

[51] Int. Cl.$^6$ .................................................... F16M 11/00

[52] U.S. Cl. ............................ 248/201; 40/604; 248/237

[58] Field of Search .................................... 248/201, 235, 248/240.4, 298.1, 237, 214; 40/603, 604, 606, 610, 611

[56] References Cited

U.S. PATENT DOCUMENTS

| | | | |
|---|---|---|---|
| 1,891,463 | 12/1932 | Yock | 248/240.4 |
| 2,072,754 | 3/1937 | Jones . | |
| 2,899,764 | 8/1959 | Oberlin, Jr. . | |
| 2,954,626 | 10/1960 | Kies . | |
| 2,954,627 | 10/1960 | Kies . | |
| 3,108,803 | 10/1963 | Naideth | 298/237 |
| 3,310,899 | 3/1967 | Hart et al. . | |
| 3,901,481 | 8/1975 | Probst | 248/237 |
| 4,554,754 | 11/1985 | Stilling . | |
| 5,408,770 | 4/1995 | Suzuki . | |

*Primary Examiner*—Leslie A. Braun
*Assistant Examiner*—Willie Berry, Jr.
*Attorney, Agent, or Firm*—Barrigar & Moss

[57] ABSTRACT

A mount is disclosed for banners and signs having a pair of spaced-apart stands for attachment to a wall or roof parapet. A first stand of the pair includes a first transverse member for holding one end of the banner. The second stand of the pair includes a longitudinal telescopic member having a second transverse member attached thereto for holding the opposite end of the banner. A gross adjustment means in one of the stands positions the longitudinal telescopic member in a desired pre-selected position to suit the length of the banner, and a fine adjustment means moves the second transverse member to stretch and tension the banner.

6 Claims, 8 Drawing Sheets

BANNER MOUNT

FIELD OF THE INVENTION

This invention relates to mounting structures for outdoor signs and banners of the type that are formed of flexible sheet material.

Semi-permanent signs or banners are often used for advertising purposes, and since these signs or banners are not intended to have a long life, it is necessary to keep their cost to a minimum. One way of doing this to use a flexible sheet material such as canvas or reinforced plastic and paint or print the advertising message thereon. This sheet material is then held in position by some type of mounting structure that stretches the sheet material to make it as flat as possible to improve the visibility of the advertising message.

Several different types of mounting structures have been used in the past for banners and the like. One of these is shown in U.S. Pat. No. 2,954,627 issued to E. J. Kies. This device shows a structure having longitudinal telescoping members which are adjustable in length to match the approximate length of the banner to be mounted thereon. Springs are used at one end of the telescoping members to tension the banner. A difficulty with this type of structure however, is that spring tension is inadequate to properly tension anything but the smallest signs or banners. With insufficient tension, the banners just flog in the wind making it difficult to see the advertising message and resulting in premature wear and possible destruction of the banner. While it may be possible to reduce these drawbacks by increasing the spring tension, this makes it extremely difficult if not impossible to mount the banner on the structure.

In order to obtain higher tension in the banner, various devices have been used. One example of this is shown in U.S. Pat. No. 2,899,764 issued to R. E. Oberlin, Jr. This patent shows the use of a plurality of turn-buckles located at one end of the banner to produce the desired tension. While turn-buckles are capable of achieving very high tension, their drawback is that they give limited length adjustment and are very time consuming to adjust.

Another example of a device capable of producing higher tension in a sign or banner is shown in U.S. Pat. No. 4,554,754 issued to Johann Stilling. This patent shows the use of a special frame with a threadably mounted holder for the sign. A difficulty with this structure, however, is that there is only limited adjustability and multiple tensioning screws are required, making the sign installation time consuming and expensive.

BACKGROUND OF THE INVENTION

The present invention provides a banner mount giving a wide range of initial fast adjustment and a fine, fast, high tension adjustment to properly tension even the larger size signs and banners.

According to the invention, there is provided a mount for stretching and holding a banner in place relative to a fixed surface, the banner having opposed ends. The mount comprises first and second spaced-apart stands adapted to be attached to the fixed surface. The first stand includes a first mounting base, and a first transverse member including means for holding one end of the banner. The second stand includes a second mounting base, and a longitudinal member slidably mounted thereon for movement in a direction the banner is to be stretched. A second transverse member is connected to the longitudinal member. The second transverse member includes means for holding the opposite end of the banner. A gross adjustment means is coupled between the longitudinal member and the second mounting base for retaining the longitudinal member in a desired pre-selected longitudinal position on the second stand. Also, a fine adjustment means is operably connected between one of the first and second transverse members and the respective first and second mounting bases for incremental longitudinal movement of said one of the first and second transverse members.

BRIEF DESCRIPTION OF THE DRAWINGS

Preferred embodiments of the invention will now be described, by way of example, with reference to the accompanying drawings, in which.

DETAILED DESCRIPTION OF THE PREFERRED EMBODIMENT

Figure 1:
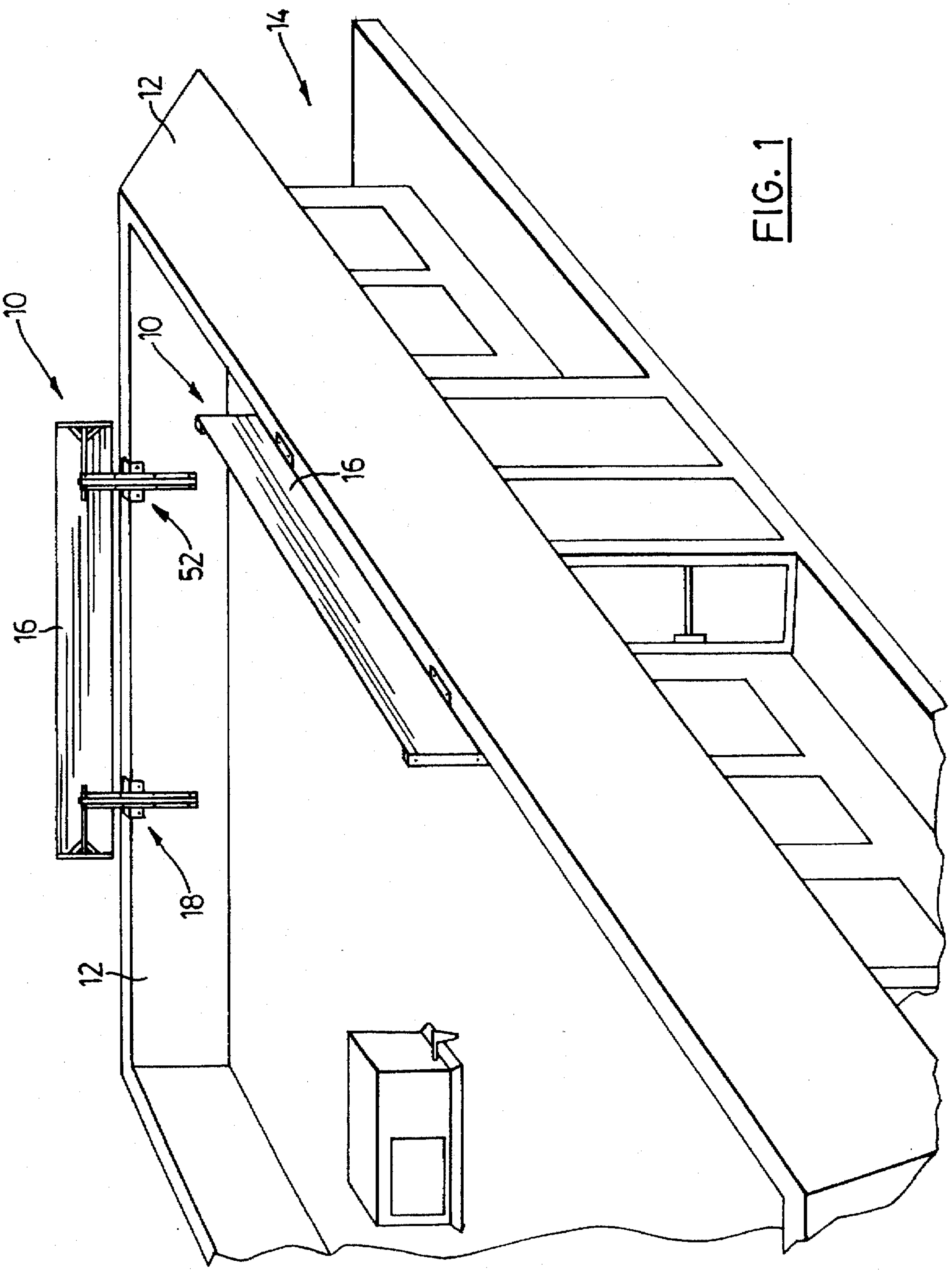
FIG. 1 is a perspective view of a building having a preferred embodiment of a banner mount according to the present invention mounted on the roof parapet.

Referring first to FIG. 1, preferred embodiments of a banner mount according to the present invention are generally indicated by reference numeral 10. Banner mounts 10 are shown attached or mounted to a parapet 12 of a typical commercial building such as a store or restaurant 14. Banner mounts 10 are shown holding up banners 16, which are formed of reinforced plastic sheet material, typically about 5 to 7 meters (16 to 24 feet) in length and about 1 meter (3 feet) in width or height. Banners 16 have any desired advertising message painted or printed thereon to be visible from the outside of building 14. The banners 16 per se are not considered to be part of the present invention, so will not be described in further detail herein. It will be appreciated by those skilled in the art, however, that banner 16 can be made of any suitable material and in any desired shape and size, provided that it is of sufficient strength to be able to be stretched tight and remain flat under normal wind loads.

Figure 2:
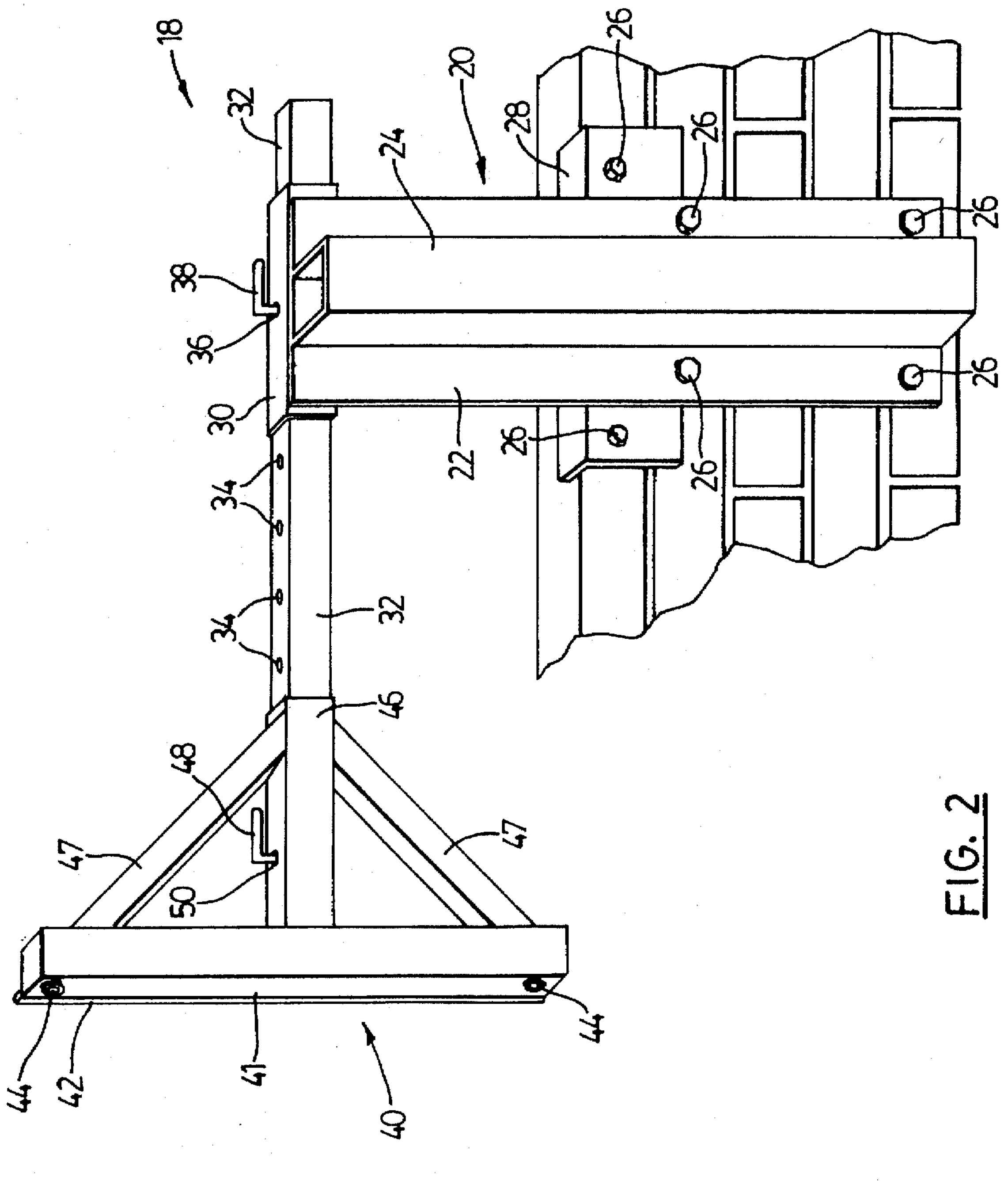
FIG. 2 is an enlarged perspective view of the first or left stand of the banner mount as seen on the far parapet in FIG. 1.

Referring next to FIG. 2, a first banner stand 18 is shown and it has a first mounting base or upright member 20 including a flat mounting plate 22 and a tubular reinforcement 24. Mounting plate 22 is attached or mounted on the parapet wall 12 using lag screws 26 and suitable concrete anchors (not shown). An optional angle plate 28 may be attached to mounting plate 22 to help support the first mounting base or upright member 20 on parapet 12. Angle plate 28 also functions to locate the first mounting base or upright member 20 at the desired vertical position on parapet 12 during installation of the first mounting base or upright member 20. Angle plate 28 may also be attached to parapet wall 12 using lag screws 26 and suitable concrete anchors (not shown).

A horizontal tubular member 30 is attached to the top end of first mounting base or upright member 20, and a longitudinal member 32 is slidingly or telescopically mounted in tubular member 30. Longitudinal member 32 has a plurality of longitudinally spaced-apart holes 34 formed therein, and tubular member 30 has a hole 36 formed therein to register with any one or a preselected one of the holes 34. A locking pin 38 passes through hole 36 and the preselected hole 34 to retain longitudinal member 32 in a desired horizontal or longitudinal position.

First stand 18 includes a first transverse member 40 which has an upright member 41 having means for holding one end of banner 16 (see FIG. 1). This holding means is in the form of a longitudinal slot 42 or bolts 44, as will be described further below.

First transverse member 40 also has a central member 46 slidingly or telescopically mounted on longitudinal member 32. A pair of oblique gussets 47 extends from the inner end of central member 46 to the outer ends of upright member 41 to strengthen and rigidify first transverse member 40. A further locking pin 48 passes through a hole 50 and one of the holes 34 to releasably retain first transverse member 40 on longitudinal member 32. It will be appreciated that this construction allows for the choice of longitudinal member 32 having any reasonable desired length to give a very wide horizontal adjustment range for the first stand 18.

Figure 3:
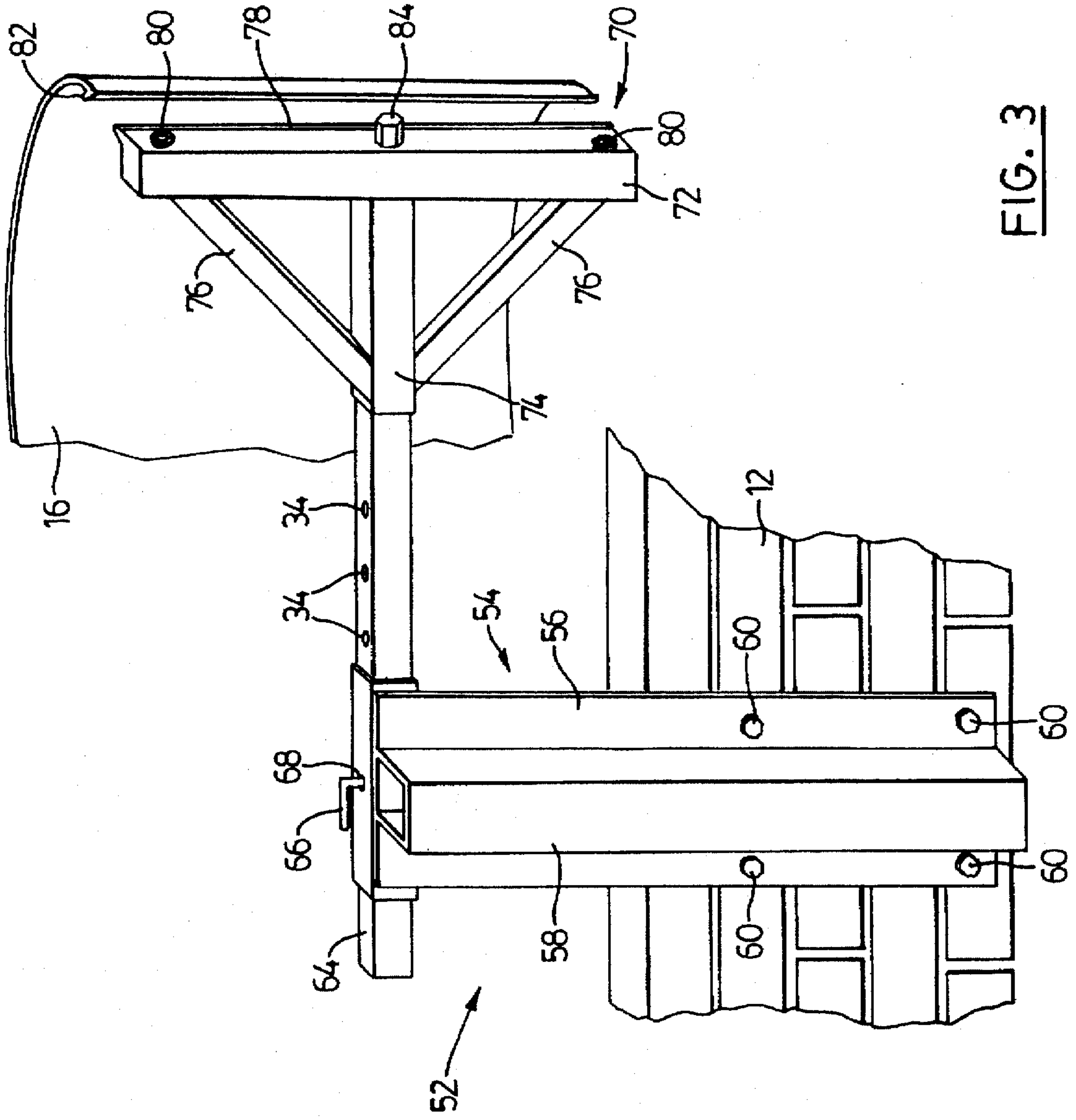
FIG. 3 is an enlarged perspective view of the second or right stand of the banner mount as seen on the far parapet in FIG. 1.

Referring next to FIG. 3, a second stand 52 is shown and it has a second mounting base or upright member 54 having a flat mounting plate 56 and a tubular reinforcement 58. Mounting plate 56 is attached to parapet wall 12 using lag screws 60 and suitable concrete anchors as described above in connection with first stand 18. It will be noted that second stand 52 does not have an angle plate 28 as in the case of the first stand 18 shown in FIG. 2, but such an angle mounting plate could be provided on second stand 52, if desired.

A tubular member 62 is also mounted at the top of a second mounting base or upright member 54, and a longitudinal member 64 is also slidably or telescopically located in tubular member 62. Again, a plurality of longitudinally spaced-apart holes 34 are formed in longitudinal member 64, and a locking pin 66 passes through a hole 68 into one of these holes 34 to lock or retain longitudinal member 64 in a desired, preselected longitudinal position. Second stand 52 includes a second transverse member 70 having an upright member 72, a central member 74 and oblique gussets 76. Upright member 72 again has means for holding the end of banner 16 opposite to the end held by first stand 18, and this holding means is in the form of an elongate, C-shaped, longitudinal slot 78, or bolts 80. Where slot 78 is used to hold or retain the end of banner 16, the end of banner 16 is formed with a thickened bead 82 that slides into slot 78 to prevent the banner from being pulled transversely out of slot 78. When the banner is under tension, bead 82 is frictionally held in slot 78 and prevented from sliding longitudinally and coming out of slot 78.

Figure 4:
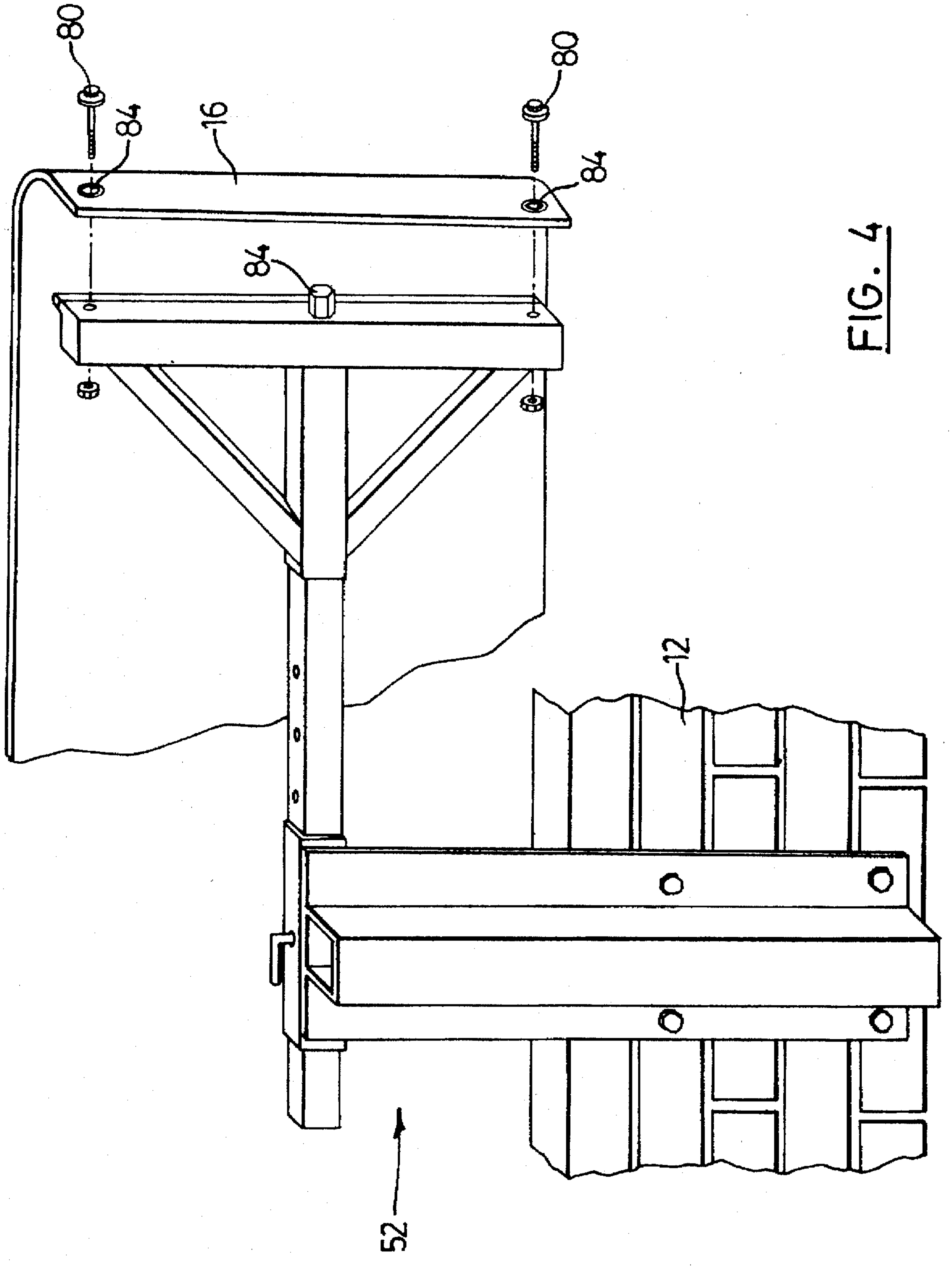
FIG. 4 is a perspective view similar to FIG. 3, but showing an alternative arrangement for mounting the banner on the stand.

Referring briefly to FIG. 4, this figure shows an alternative method of attaching banner 16 to the first and second stands 18, 52. In this embodiment, banner 16 is attached to the stand by having bolts 44 (FIG. 2) or 80 (FIGS. 3 and 4) pass through grommets 84 mounted in banner 16. It will be appreciated by those skilled in the art that other methods may be used for attaching banner 16 to the transverse members of stands 18 and 52.

Figure 5:
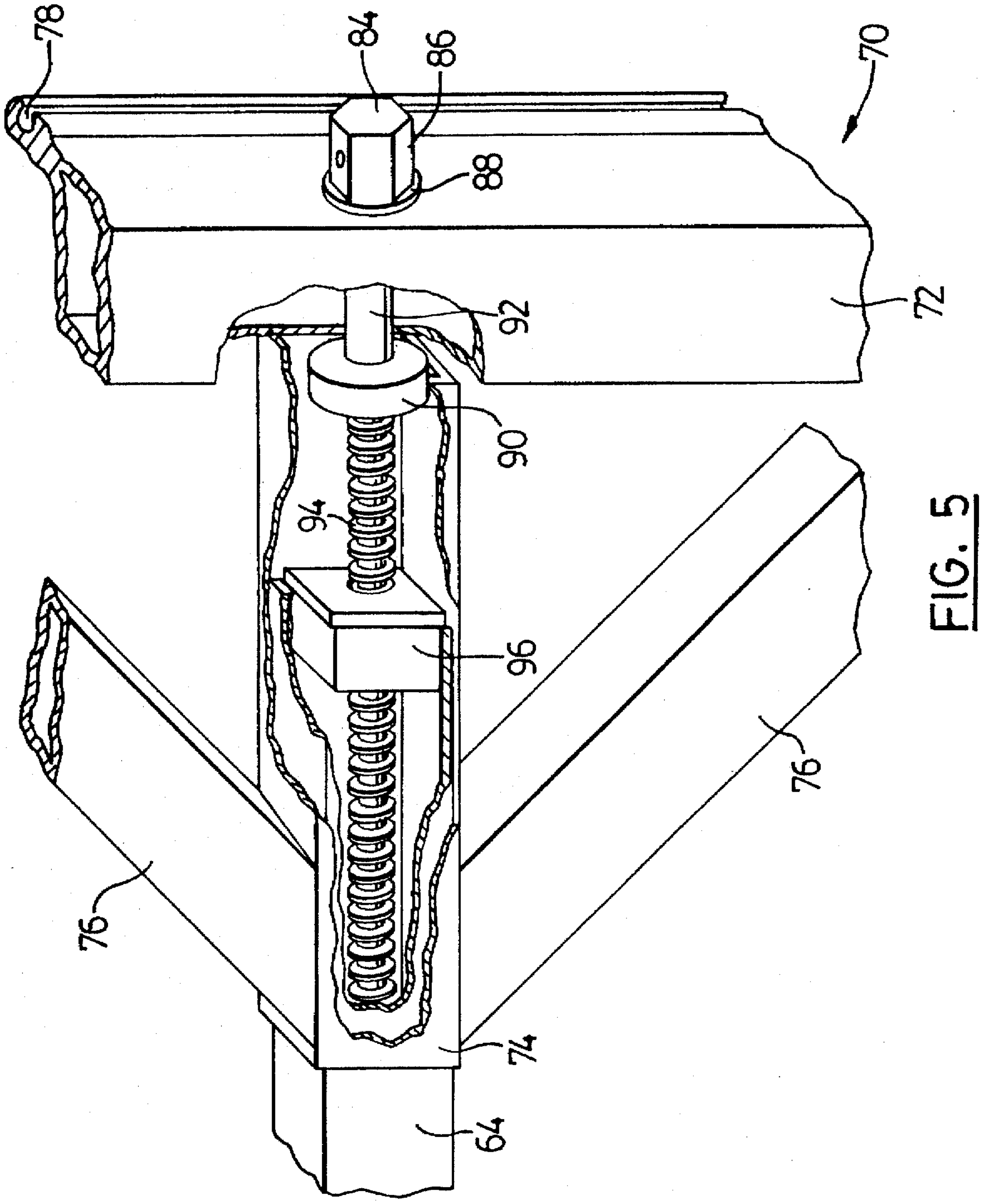
FIG. 5 is an enlarged view, partly broken away, showing the fine adjustment means of the second stand of FIGS. 3 and 4.

Referring next to FIG. 5, the fine adjustment means for adjusting the tension in banner 16 will now be described. A threaded rod or bolt 84 is rotatably mounted in upright member 72. Threaded rod 84 has a hexagonal head 86 of a standard size to be turned by a suitable socket or open end wrench. A washer 88 is located between hexagonal head 86 and the wall of upright member 72. An inner collar 90 is rigidly attached to the shaft 92 of rod 84 to prevent rod 84 from backing out of upright member 72 as it is rotated.

Rod 84 is formed with a screw thread 94, preferably an acme thread, and it is threaded into a square nut 96 press-fitted into the end of longitudinal member 64. It will be appreciated that when threaded rod 84 is turned, transverse member 70 slides longitudinally back and forth on longitudinal member 64.

The assembly of second transverse member 70 starts by inserting threaded rod 84 through upright member 72. Collar 90 is then put on shaft 92 and fixed in place, preferably by welding. Central member 74, with or without gussets 76 in place, is then slid over threaded rod 84 and fixed in place, again by welding. Second transverse member 70 is then mounted on longitudinal member 64 by sliding central member 74 over the end of longitudinal member 64 and threading threaded rod 84 into square nut 96, which has previously been mounted in the end of longitudinal member 64.

First and second stands 18, 52 are preferably formed of an aluminum alloy using square tubing ranging in size between 3.5 and 6 centimeters (1.4 to 2 inches) square, with a wall thickness of about 0.5 centimeters (3/16 inch). Preferably, an aluminum-zinc alloy is used for threaded rod 84 and square nut 96. An architectural grade aluminum is suitable for the other components of the stands.

Figure 6:
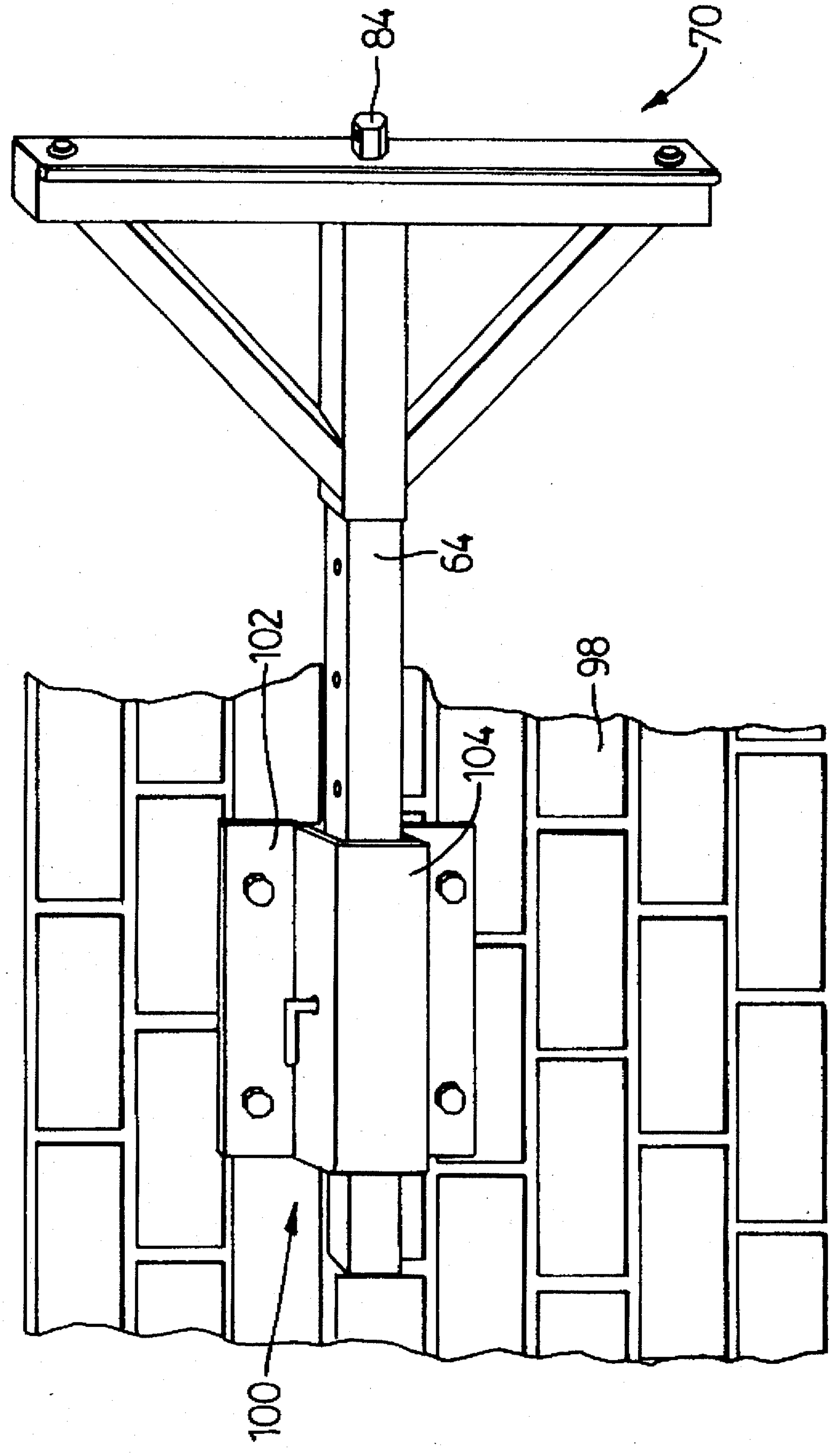
FIG. 6 is a perspective view of another embodiment of the present invention for mounting on a wall.

Referring next to FIG. 6, an alternative embodiment is shown for use where the stands are desired to be mounted on a flat wall 98. In this embodiment, the upright members 20, 54 of the embodiments of FIGS. 1 to 5 have been replaced by a simple mounting base or horizontal member 100 having a flat mounting plate 102 and a tubular reinforcing member 104 into which the longitudinal members 32 (FIG. 2) and 64 (FIGS. 3 to 6) are slidably or telescopically mounted. In all other respects, the construction of the stands is the same as in the embodiments shown in FIGS. 1 to 5.

To install banner mount 10 and mount a banner therein, first and second stands 18 and 52 are adjusted so that longitudinal members 32 and 64 are positioned about mid-range of their possible positions in tubular members 30 and 62 or 104. The fine adjustment threaded rod 84 on second stand 52 is then turned so that second transverse member 70 is in its innermost position. Stands 18, 52 are then spaced apart so that the spacing between upright members 41 and 72 approximately matches the length of banner 16. The stands are then mounted on the parapet or wall to maintain this spacing. One end of the banner is then attached or mounted in first stand 18. Locking pin 66 of second stand 52 is then removed allowing longitudinal member 64 to telescope inwardly. The second end of banner 16 is then attached to or mounted in second stand 52. Longitudinal member 64 is then extended to put some tension on banner 16. Locking pin 66 is then reinserted to lock longitudinal member 64 in place, and threaded rod 84 is then turned to apply the final high tension to banner 16 stretching it tightly to maintain it in a flat condition under all normal wind loads. To remove or replace banner 16, the above procedure is reversed.

Figure 7:
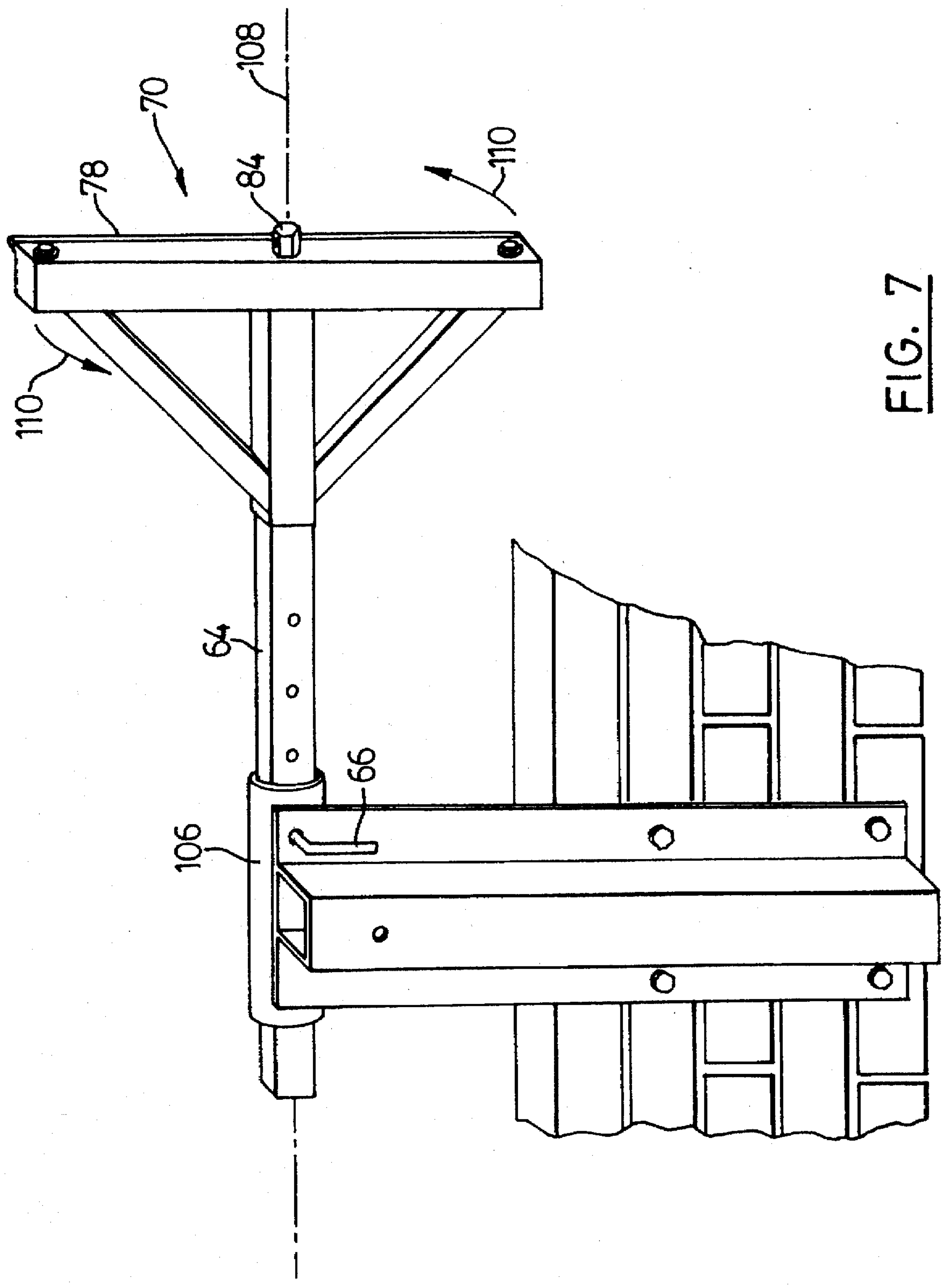
FIG. 7 is a perspective view similar to FIGS. 3 and 4, but showing a modification to facilitate the mounting of a banner in the banner mount of the present invention.

Referring next to FIG. 7, a modification to the embodiments described above is shown to make it easier to mount a banner of the type having an end bead 82 sliding into retaining slots 42, 78. In this embodiment, the square tubular members 30, 62 of the FIGS. 1 to 6 embodiments are replaced by a circular tubular member 106, so that longitudinal members 32, 64 can rotate about the axis 108 thereof as indicated by arrows 110. To mount a banner in this embodiment, locking pins 38, 66 are removed, and transverse members 40 and 70 are rotated to lie in a horizontal plane with slots 42, 78 facing up. The banner can then be slid horizontally into these slots and will stay in position until some or all of the desired tension is put on the banner. When using this embodiment in this way and the transverse members 40, 70 are rotated into the upright position, the banner will not slip out of the slots 42, 78 before tension is applied to the banner.

Figure 8:
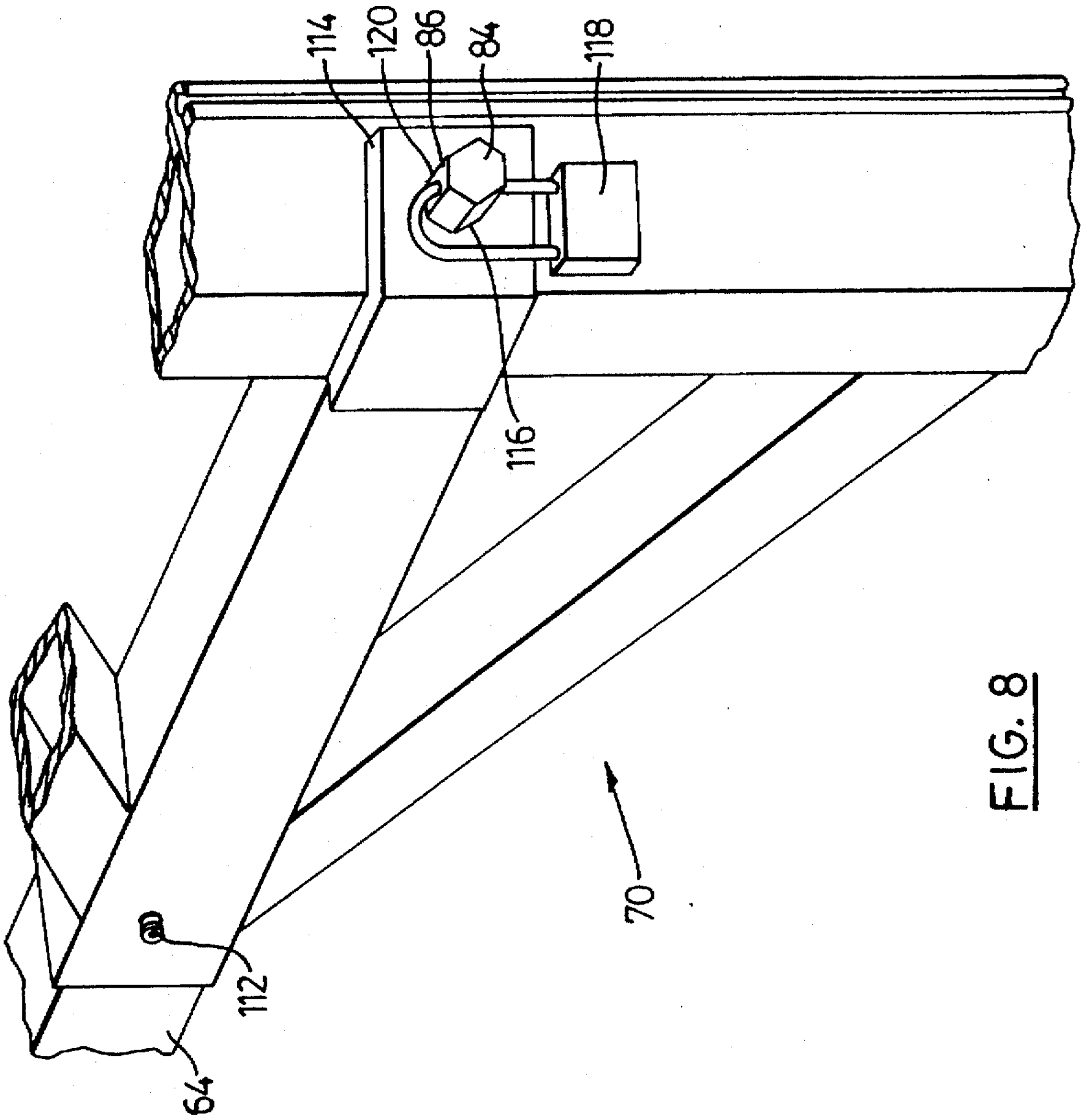
FIG. 8 is a scrap view of a portion of one of the stands of the present invention showing various locking mechanisms for the stands of the present invention.

FIG. 8 shows a couple of methods of locking transverse member 70 in place on longitudinal member 64. The first locking device is a set screw 112 threaded into one of the walls of central member 74 to bear against longitudinal member 64. Set screw 112 thus would prevent transverse member 70 from sliding inwardly to loosen the banner in the event that vibration or some other force caused threaded rod 84 to rotate and loosen undesirably. Another locking device is an L-shaped bracket 114 having a hexagonal hole 116 to accommodate the hexagonal head 86 of threaded rod 84. With L-shaped bracket 114 in place, threaded rod 84 cannot turn. A padlock 118 passing through a hole 120 in hexagonal head 86 prevents bracket 114 from being removed, making banner mount 10 tamper proof, in that tension cannot be relieved from the banner and the banner removed without removing pad lock 118 and L-shaped bracket 114.

Having described preferred embodiments of the invention, it will be appreciated that various modifications may be made to the structures described above. For example, both the first and second stands 18, 52 have been described as having gross adjustment means for releasibly retaining the longitudinal members 32, 64 in a pre-selected longitudinal position in the stands, but only one of the stands need have this gross adjustment means. Similarity, the fine adjustment means in the form of threaded rod 84 can be mounted in the first transverse member 40 or in both transverse members 40, 70, if desired. For the purposes of this disclosure and the claims herein, the terms first and second in relation to the stands are intended to be used interchangeably. In other words, the gross adjustment means can be on the first stand alone. The second transverse member 70 and its associated longitudinal member 64 can be mounted on the first stand and the first transverse member 40 and its associated longitudinal member 32 can be mounted on the second stand. Further, the stands can be attached to fixed surfaces other than a wall or a parapet, such as the ground. In this case, the mounting bases or upright members could be attached to a post mounted in the ground or these members could be replaced by posts or other standards attached or mounted in the ground or any other vertical or horizontal surface. Other modifications may be made to the structures described, as will be apparent to those skilled in the art. If desired, first transverse member 40 could be attached directly and rigidly to its associated mounting base or upright member 20 omitting longitudinal member 32.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A mount for stretching and holding an elongate banner in place relative to a fixed surface, the banner having opposed ends, the mount comprising:

first and second spaced-apart stands adapted to be attached to the fixed surface;

the first stand including a first mounting base, and a first transverse member including means for holding one end of the banner;

the second stand including a second mounting base, a tube, and a longitudinal member telescopically located in said tube for movement in a direction the banner is to be stretched;

a second transverse member connected to the longitudinal member, the second transverse member including means for holding the opposite end of the banner;

a gross adjustment means coupled between the longitudinal member and the second mounting base for retaining the longitudinal member in a desired preselected longitudinal position on the second stand; and a fine adjustment means operably connected between the second transverse member and the longitudinal member for incremental longitudinal movement of said second transverse member, the fine adjustment means being a threaded member rotatably mounted in the second transverse member to threadably engage the longitudinal member.

2. A mount as claimed in claim 1 wherein the threaded member is formed with an acme screw thread.

3. A mount as claimed in claim 1 and further comprising releasable locking means for preventing the threaded member from rotating.

4. A mount for stretching and holding an elongate banner in place relative to a fixed surface, the banner having opposed ends, the mount comprising:

first and second spaced-apart stands adapted to be attached to the fixed surface;

the first stand including a first mounting base, and a first transverse member including means for holding one end of the banner;

the second stand including a second mounting base, and a longitudinal member slidably mounted thereon for movement in a direction the banner is to be stretched;

a second transverse member connected to the longitudinal member, the second transverse member including means for holding the opposite end of the banner;

the first stand including a tube and an additional longitudinal member telescopically located therein for movement in the direction the banner is to be stretched, the first transverse member being attached to said additional longitudinal member;

a gross adjustment means coupled between the longitudinal member and the second mounting base for retaining the longitudinal member in a desired preselected longitudinal position on the second stand; and a fine adjustment means being a threaded member rotatably mounted in the first transverse member to threadably engage the additional longitudinal member for incremental longitudinal movement of said one of the first and second transverse members.

5. A mount for stretching and holding an elongate banner in place relative to a fixed surface, the banner having opposed ends, the mount comprising:

first and second spaced-apart stands adapted to be attached to the fixed surface;

the first stand including a first mounting base, and a first transverse member including means for holding one end of the banner;

the second stand including a second mounting base, and a longitudinal member slidably mounted thereon for movement in a direction the banner is to be stretched;

a second transverse member connected to the longitudinal member, the second transverse member including means for holding the opposite end of the banner;

a gross adjustment means coupled between the longitudinal member and the second mounting base for retaining the longitudinal member in a desired preselected longitudinal position on the second stand; and a fine adjustment means operably connected between one of the first and second transverse members and the respective first and second mounting bases for incremental longitudinal movement of said one of the first and second transverse members, the means for holding the ends of the banner including means defining elongate C-shaped slots formed in the first and second transverse members, said slots being adapted to hold transverse retaining beads formed on the ends of the banner.

6. A mount for stretching and holding an elongate banner in place relative to a fixed surface, the banner having opposed ends, the mount comprising:

first and second spaced-apart stands adapted to be attached to the fixed surface;

the first stand including a first mounting base, and a first transverse member including means for holding one end of the banner;

the second stand including a second mounting base, and a longitudinal member slidably mounted for movement in a direction the banner is to be stretched;

a second transverse member connected to the longitudinal member, the second transverse member including means for holding the opposite end of the banner;

a gross adjustment means coupled between the longitudinal member and the second mounting base for retaining the longitudinal member in a desired preselected longitudinal position on the second stand; and a fine adjustment means operably connected between one of the first and second transverse members and the respective first and second mounting bases for incremental longitudinal movement of said one of the first and second transverse members; and releasable locking means for rendering the fine adjustment means inoperative.

* * * * *